Feb. 13, 1962 — R. W. REICH — 3,021,468
RECHARGEABLE FLASHLIGHT BATTERY AND
CIRCUIT FOR RECHARGING SAME
Filed Aug. 20, 1956 — 3 Sheets-Sheet 1

INVENTOR.
ROBERT W. REICH
BY
Cyrus D. Samuelson
ATTORNEY

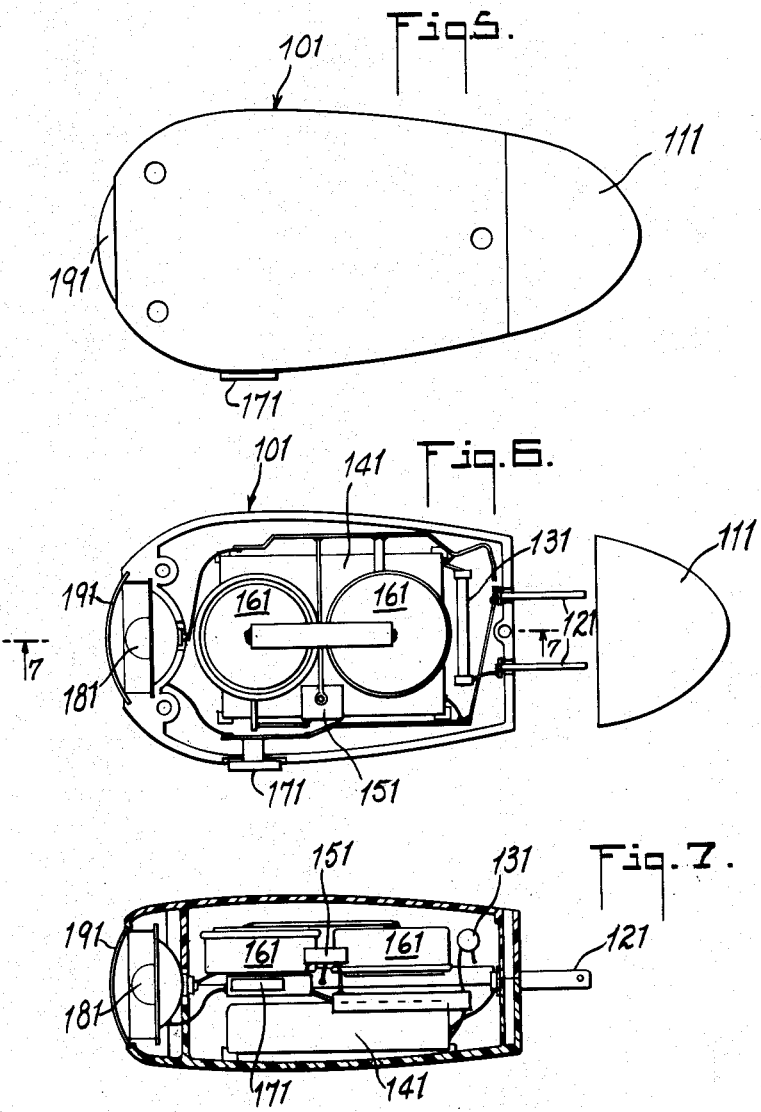

United States Patent Office 3,021,468
Patented Feb. 13, 1962

3,021,468
RECHARGEABLE FLASHLIGHT BATTERY AND
CIRCUIT FOR RECHARGING SAME
Robert Walter Reich, Freiburg im Breisgau, Germany
Filed Aug. 20, 1956, Ser. No. 604,923
6 Claims. (Cl. 320—2)

My invention relates to rechargeable flashlight batteries and to circuits for recharging said batteries and in particular to such circuits which may be produced with miniaturized components and which do not overload due to surge.

There are many circuits for recharging batteries. Quite commonly, transformers are used to reduce the line voltage to the desired rectifier charging level. Circuits utilizing capacitors as impedance elements are also employed for battery recharging. These circuits and completed assemblies are expensive and possess certain other disadvantages. The transformer units are relatively heavy and occupy considerable space. The circuits, which use capacitors or other impedance elements cause an overload to be applied to the load due to the initial charging surge.

In order to prevent operational failure, it is necessary to design the circuit and use circuit elements with sufficiently high constants so as to be able to withstand the surge conditions. In these prior art devices, a much higher voltage is applied to the unit at the completion of the charging period than at the start because this voltage depends on the charging current.

A simple foolproof circuit, which would permit the recharging of self-contained batteries used in flashlights, electrical and electronic equipment, is clearly desirable. Such a system will increase the utility of miniaturized electronic and electrical equipment which is operated from a self-contained battery power source. A few examples of this type of equipment are hearing-aids, pocket sized receivers and recorders, small flashlights and like equipment.

Accordingly, it is a principal object of my invention to provide a simple, economical circuit for recharging batteries.

It is a further object of my invention to provide a circuit for recharging batteries which does not apply an overload to the load because of the initial surge.

It is a still further object of my invention to provide a flashlight wherein the battery recharging circuit is contained in the flashlight housing.

Other objects and advantages of my invention will be apparent during the course of the following description.

Figure 2:
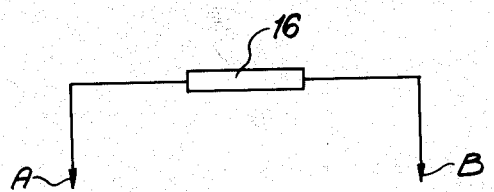
Figure 1:
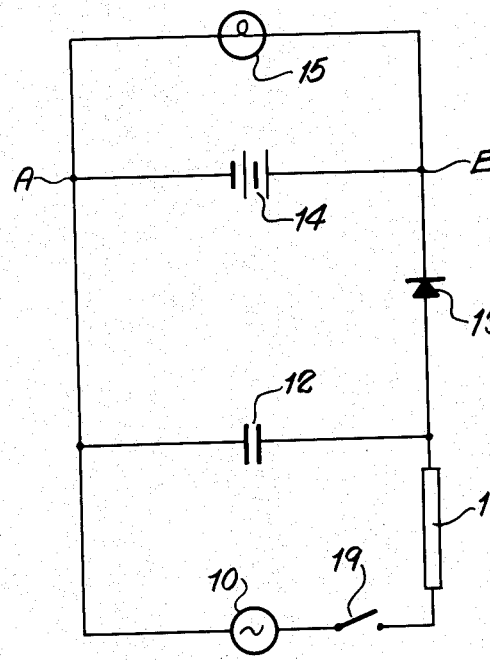
Figure 3:
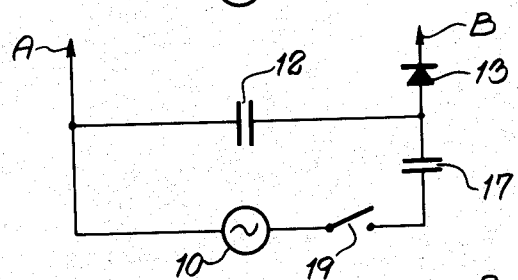
Figure 4:
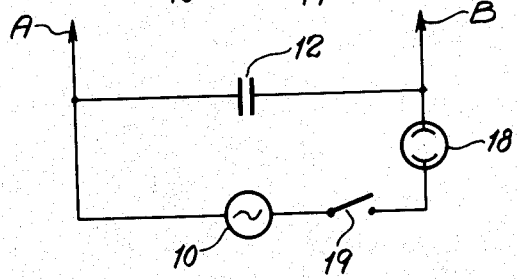

In the accompanying drawings, forming a part of this application, and in which like numerals are employed to designate like parts throughout the same:

FIGURE 1 is a schematic circuit diagram of one form of my invention,

FIGURE 2 illustrates an alternative load which may be connected across points A and B of FIGURE 1, FIGURE 3 illustrates an alternative input circuit which may be connected across points A and B of FIGURE 1, FIGURE 4 illustrates a further alternative input circuit which may be connected across points A and B of FIGURE 1, FIGURE 5 is a plan view of a flashlight utilizing the battery recharging circuit of my invention as an integral unit within the flashlight housing, FIGURE 6 is a view similar to that of FIGURE 5 with one half of the flashlight housing removed, and FIGURE 7 is a cross-sectional view along the line 7—7 of FIGURE 6.

Figure 8:
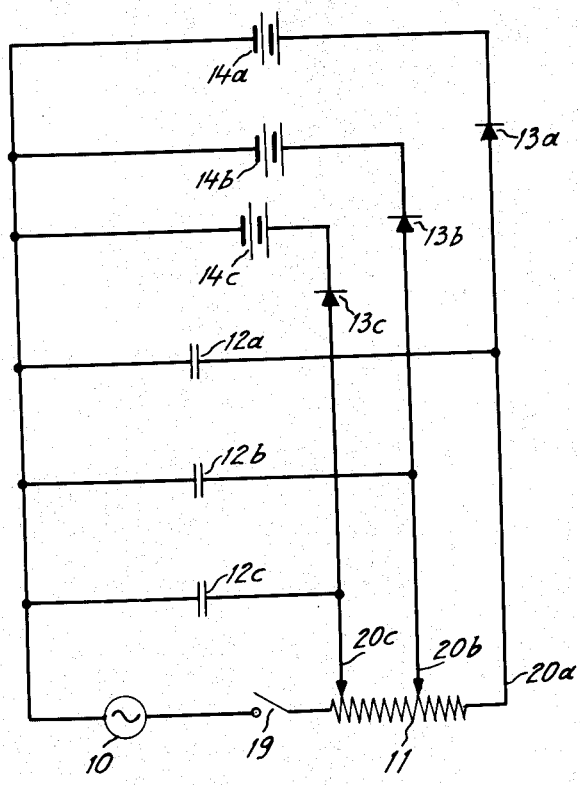

FIG. 8 is a schematic circuit diagram of another form of my invention for simultaneously recharging more than one rechargeable battery.

In the drawings, wherein for the purpose of illustration, are shown preferred embodiments of my invention, the numeral 10 designates the source of A.-C. voltage which is applied through thermistor 11 and across capacitor 12 to rectifier 13 and battery 14. The A.-C. voltage suitably is a conventional line voltage which may be from 110 to 115 volts and having a frequency of 60 cycles per second. Lamp 15 is connected across battery 14. Load 16 may be substituted for lamp 15. Capacitor 17 may be substituted for thermistor 11 and glow lamp 18 may be substituted for thermistor 11 and rectifier 13. Switch 19 serves to apply the A.-C. voltage to the circuit.

In FIGURES 5, 6 and 7, the numeral 101 designates the flashlight housing in which all the components are contained. End cap 111 may be removed to enable plug 121 to be inserted in the power line during recharging. Resistor 131, capacitor 141, rectifier 151, and batteries 161 constitute the battery and its recharging circuit as described above. Switch 171 serves to apply voltage to lamp 181 whose rays are focused by lens 191.

The value of the resistance of thermistor 11 depends on its temperature. As it gets warmer, its resistance decreases and as it gets cooler, its resistance increases so that as the recharging current decreases, the resistance of 11 increases. This permits automatic regulation of the recharging current and voltage so that inadvertent or otherwise excessive recharging time does not cause damage to the battery 14 or other circuit elements. A resistor may be substituted for thermistor 11. It is well known that during the period of charging of the battery, its E.M.F. is bucked by the voltage of the charging source. At the beginning of the charging period, that is when the battery to be charged is in its most discharged state, its E.M.F. is at its lowest. At this point it is desired that the greatest amount of charging current be applied to the battery. As the battery charges, the ampere-hours out of the battery decrease and the charging rate must correspondingly decrease. The rate of charging should be not such that gassing occurs. It is thus seen that a thermistor is particularly effective in regulating the recharging current. At the beginning of the charging period when the bucking E.M.F. of the battery to be charged is the lowest, the presence of the thermistor permits a maximum charging current to be supplied to the battery. As the battery charges, its E.M.F. increases. As a consequence, less current passes through the thermistor, causing the latter to cool. Its resistance thereby increases and the current is further decreased. Where the thermistor is replaced by a resistor, the resistor is utilized as a voltage dropping element and of course in this situation, the increase of the battery E.M.F. as the battery charges also becomes an important factor in decreasing the charging current.

A.-C. voltage is applied from 10 through 11 and 12 and is rectified by 13 so that direct current is applied to battery 14. The values of 11 and 12 are chosen so that the desired charging current is applied to 14. The charging curve for a capacitor is given by the equation:

$$U_e = u\left(1 - e^{-\frac{t}{RC}}\right)$$

where $U_e$ is the voltage on the capacitor at the time $t$. At the instant when switch 19 is closed, the current is only limited by the series resistance in the line circuit and the values of 12 and 11 are chosen so as to produce the correct current for charging 14. The values of 11 and 12 are chosen so that the circuit time constant is longer than the period of the A.-C. supply. This permits sufficient time to recharge 12 to the desired voltage but insufficient time for the voltage across 12 to reach a value higher than that needed to charge 14. Thus, it is seen that capacitor 12 plays a part in controlling the level of voltage applied to battery 14 through rectifier 13.

For small units, 13 may be a crystal diode while for units requiring higher charging current, a rectifier of selenium or other materials may be used. This circuit of my invention is such that the voltage rating of 12 and 13 need only be equal to the voltage of 14.

Lamp 15 may be operated from 14 during the recharging of 14 and since there is no initial surge when the current is turned on, lamp 15 will not have a higher than normal voltage applied to it.

Load 16 of FIGURE 2 may be substituted for lamp 15 by connecting it, in place of lamp 15, across points A and B of FIGURE 1.

The input circuit of FIGURE 3 may be substituted for the input circuit of FIGURE 1 by connecting it across points A and B of FIGURE 1. Capacitor 17 which is substituted for thermistor 11 will have a similar effect so long as the impedance is of the proper value so as to limit the current. It is seen that capacitors 12 and 17 and rectifier 13 form a voltage divider network which determines the voltage at the junction point of capacitor 17 and rectifier 13. The values of capacitors 12 and 17 are so chosen that the voltage applied to battery 14 through rectifier 13 is kept at a safe limit and yield the correct time constant.

The input circuit of FIGURE 4 may be substituted for that of FIGURE 1 by connecting it across points A and B of FIGURE 1. Glow lamp 18 serves to replace both thermistor 11 and rectifier 13. It is well known that a glow discharge lamp which is a gas tube is a voltage regulator in that its resistance decreases as more current passes therethrough, due to increased ionization of the gas therein and vice versa. Thus there is a substantially constant voltage drop across the tube. Also, during the positive half of the cycle, the glow discharge tube conducts to provide charging current for battery 14, also charging capacitor 12. During the negative half-cycle, the discharge of capacitor 12 prevents any discharging of battery 14.

In the event that batteries of different voltages are utilized in an electronic unit, thermistor or resistor 11 is tapped and capacitors 12 of varying values commensurate with the recharging currents required are connected to the taps. As shown in FIG. 8 each separate tap on element 11, (20a, 20b or 20c) provides a circuit including a capacitor (12a, 12b or 12c), a diode (13a, 13b or 13c) and a battery (14a, 14b, or 14c) all connected with relation to power supply 10 in a manner similar to that shown in FIG. 1. In this manner, the whole battery supply may be recharged at the same time from the same power source. The recharging unit may be built into the equipment housing or it may be contained in an external adaptor which is available to be plugged into the unit and the power line, as required.

FIGURES 5, 6 and 7 illustrate a rechargeable flashlight of my invention utilizing a nickel-iron or nickel-cadmium battery. For operation, switch 171 is closed, thereby closing the circuit and supplying voltage from 161 to 181. When the voltage in 161 gets low, end cap 111 is removed, exposing plug 121. 121 is inserted in the power mains socket and batteries 161 are recharged. The recharging circuit operates as described above. When batteries 161 are recharged, the assembly is removed from the socket and 111 is replaced. The unit is now, once again, ready for operation.

While I have described my invention by means of specific examples and in specific embodiments, I do not wish to be limited thereto, for obvious modifications will occur to those skilled in the art without departing from the spirit of my invention or the scope of the subjoined claims.

Having thus described my invention, I claim:

1. A circuit for recharging batteries comprising a resistance and capacitor in a series circuit across the A.-C. power supply; the time constant of said series circuit being much longer than that of the period of said A.-C. supply; a rectifier connected from the junction of said resistance and said capacitor in series with the battery to be charged to the other side of said capacitor.

2. A circuit for recharging batteries comprising a tapped resistance, and a plurality of capacitors such that a portion of said tapped resistance and each of said capacitors is in series with the A.-C. power supply, a rectifier connected from each of said taps in series with the battery to be charged to the other side of the capacitor connected to said tap; the values of said portion of said resistance and each of said capacitors being such that the recharging currents and voltages are just sufficient to charge the respective batteries.

3. A circuit for recharging batteries as described in claim 2 wherein said tapped resistance is a thermistor.

4. A flashlight comprising a housing, there being mounted in said housing, a battery of at least one storage cell, a resistor, a capacitor, a rectifier, a lamp, a switch and means for connecting said flashlight to power mains, said resistor and capacitor being connected in a series circuit across said means for connecting to said power mains, said rectifier being connected from the junction of said resistor and capacitor to one terminal of said battery, the other terminal of said battery being connected to the other terminal of said capacitor, one terminal of said battery being connected to one terminal of said lamp, the other terminal of said battery being connected to one pole of said switch, the second pole of said switch being connected to the second terminal of said lamp; the time constant of said series circuit being much longer than that of the period of A.-C. supply from said power mains.

5. A flashlight as described in claim 4 wherein said storage cell is of the nickel-iron type.

6. A flashlight as described in claim 4 wherein said storage cell is of the nickel-cadmium type.

References Cited in the file of this patent

UNITED STATES PATENTS

| | | |
|---|---|---|
| 2,072,278 | Schade | Mar. 2, 1937 |
| 2,097,014 | Bates | Oct. 26, 1937 |
| 2,413,033 | Potter | Dec. 24, 1946 |
| 2,444,745 | Mosley | July 6, 1948 |
| 2,498,814 | Little et al. | Feb. 28, 1950 |
| 2,518,039 | Malki et al. | Aug. 8, 1950 |
| 2,594,801 | Rees | Apr. 29, 1952 |
| 2,628,339 | Werner | Feb. 10, 1953 |
| 2,642,520 | Coolidge et al. | June 16, 1953 |
| 2,709,238 | Wheat et al. | May 24, 1955 |
| 2,880,306 | Witte | Mar. 31, 1959 |

FOREIGN PATENTS

| | | |
|---|---|---|
| 73,496 | Netherlands | Oct. 15, 1953 |

OTHER REFERENCES

"Radio Amateurs' Worksheet," CQ, June 1945, pp. 27, 28.

Waidelich et al.: "The Half-Wave Voltage Doubling Rectifier Circuit," article in "Proceedings of the I.R.E.," December 1942, pp. 535–541.